United States Patent
Wang

(10) Patent No.: US 6,188,317 B1
(45) Date of Patent: Feb. 13, 2001

(54) MULTIFUNCTIONAL SAFETY WARNING DEVICE FOR VEHICLE

(76) Inventor: Ching-Yung Wang, No. 111, Cheng-Nang Street, Ching-Hsuag Cheng, Taichung Hsien (TW)

(*) Notice: Under 35 U.S.C. 154(b), the term of this patent shall be extended for 0 days.

(21) Appl. No.: 09/544,763

(22) Filed: Apr. 7, 2000

(51) Int. Cl.$^7$ ...................................................... G60Q 1/34
(52) U.S. Cl. ..................... 340/465; 340/464; 340/471; 340/472; 340/475; 362/485; 362/488; 362/800
(58) Field of Search .................................... 340/463, 464, 340/465, 468, 471, 472, 473, 475; 362/800, 485, 487, 488

(56) References Cited

U.S. PATENT DOCUMENTS

| | | | |
|---|---|---|---|
| 4,806,903 | * | 2/1989 | Rust ....................................... 340/475 |
| 4,891,625 | * | 1/1990 | VanRiper et al. ..................... 340/479 |
| 4,954,808 | * | 9/1990 | Duerkob ................................ 340/475 |
| 5,663,707 | * | 9/1997 | Bartilucci ............................. 340/464 |
| 5,764,141 | * | 6/1998 | Chang ................................... 340/465 |
| 6,067,010 | * | 5/2000 | Wang .................................... 340/464 |

\* cited by examiner

*Primary Examiner*—Daniel J. Wu
(74) *Attorney, Agent, or Firm*—Rosenberg, Klein & Lee

(57) ABSTRACT

A multifunctional safety warning device for a vehicle includes a mediate light bar zone having a first side and a second side; a left indicating light mounted on the first side of the mediate light bar zone and being adapted to light independently; and a right indicating light mounted on the second side of the mediate light bar zone and being adapted to light independently. In such a manner, the mediate light bar zone, the left indicating light, and the right indicating light are connected to and controlled by a control unit, whereby, the control unit is used to alternatively operate the mediate light bar zone, the left indicating light, and the right indicating light of the safety warning device, and to operate a set of breakdown light of the vehicle so that at least one set of light is used indicate a steering direction of the vehicle.

8 Claims, 5 Drawing Sheets

MULTIFUNCTIONAL SAFETY WARNING DEVICE FOR VEHICLE

BACKGROUND OF THE INVENTION

1. Field of the Invention

The present invention relates to a multifunctional safety warning device, and more particularly to a multifunctional safety warning device for a vehicle such as an automobile, motorcycle, bicycle and the like.

2. Description of the Related Art

The closest prior art of which the applicant is aware is disclosed in his U.S. patent application Ser. No. 09/213,276, entitled by "AUXILIARY SAFETY WARNING LAMP SYSTEM FOR A VEHICLE", which is now allowed.

A conventional warning light is mounted on an inside of the rear windshield of a car for indicating the situation of the car when it is braking so as to warn and remind the following car.

However, the warning light is directly connected to the braking light so that the warning light functions the same as the braking light, and cannot increase the warning effect.

In addition, the warning light is a red light continuously lighting so as to provide a warning effect. When the car breaks down or when it is in a bad viewing condition such as in a cloudy, foggy, typhoon, or rainy day, two yellow directional lights of the car will blink to warn the following car. During the successive travel, it needs to turn on the yellow directional light when the car is turned left or right so that a blind point is created, thereby causing a dangerous condition.

Further, when the right directional light and the left directional light are allowed to be close to each other, if the distance of viewing is increased, the two close points are easily mistaken as the same point, especially when the viewing condition is bad so that it is not easy to distinguish if the point at a far spaced distance is the right directional light or the left directional light, thereby greatly causing confusion to the following car.

Moreover, when the right directional light and the left directional light respectively have a right directed arrow and a left directed arrow, the light at a far distant position will be taken as a spot so that it is not easy to distinguish if the spot is the right directional light or the left directional light, thereby greatly causing confusion to the following car.

Further, the warning light often provides a warning function, and cannot be used to provide a direction indicating function.

SUMMARY OF THE INVENTION

The present invention has arisen to mitigate and/or obviate the disadvantage of the conventional warning light.

In accordance with one aspect of the present invention, there is provided a multifunctional safety warning device for a vehicle comprising: a mediate light bar zone having a first side and a second side; a left indicating light mounted on the first side of the mediate light bar zone and being adapted to light independently; and a right indicating light mounted on the second side of the mediate light bar zone and being adapted to light independently.

By such an arrangement, the mediate light bar zone, the left indicating light, and the right indicating light are connected to and controlled by a control unit, whereby the control unit is used to alternatively operate the mediate light bar zone, the left indicating light, and the right indicating light of the safety warning device, and to operate a set of breakdown light of the vehicle so that at least one set of light is used indicate a steering direction of the vehicle.

When the breakdown light of the vehicle blinks, the control unit is used to operate the left indicating light and the right indicating light of the safety warning device so that the left indicating light and the right indicating light do not blink so as to indicate a turn left/right steering direction of the vehicle.

When the left indicating light and the right indicating light of the safety warning device blink, the control unit is used to operate the breakdown light of the vehicle so that breakdown light of the vehicle does not blink so as to indicate a turn left/right steering direction of the vehicle.

When the left indicating light and the right indicating light of the safety warning device blink, the control unit is used to operate the mediate light bar zone so that the mediate light bar zone lights continuously, thereby facilitating a far following vehicle apparently distinguishing the left indicating light and the right indicating light and knows a front vehicle is disposed at an emergency state.

Further benefits and advantages of the present invention will become apparent after a careful reading of the detailed description with appropriate reference to the accompanying drawings.

DETAILED DESCRIPTION OF THE INVENTION

Figure 1:
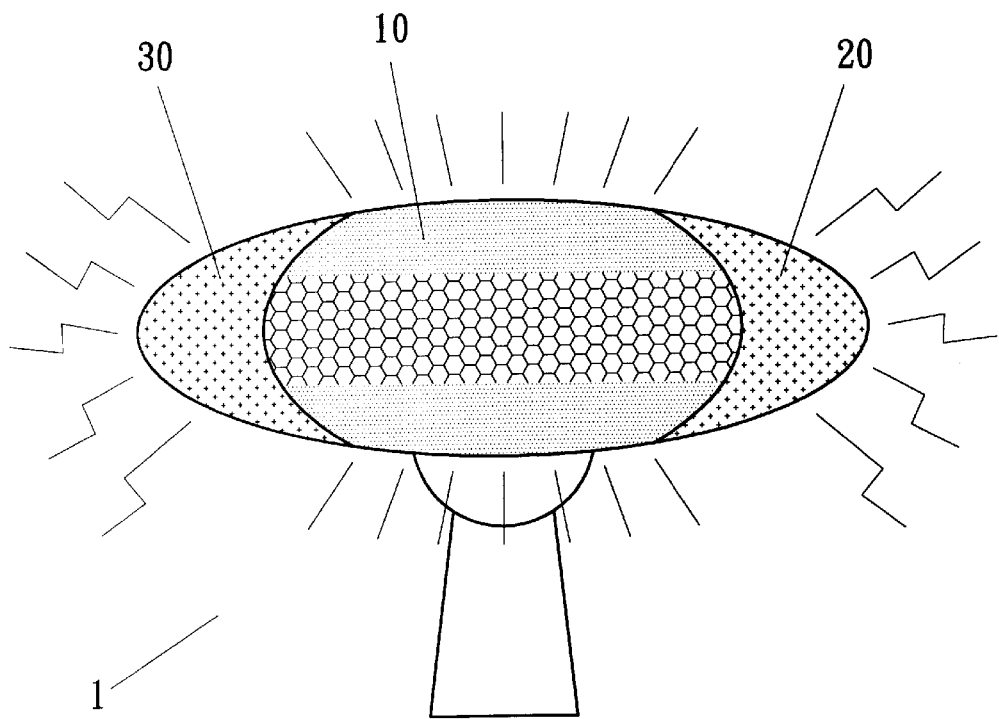
FIG. 1 is a schematic view of a multifunctional safety warning device in accordance with the present invention.
Figure 2:
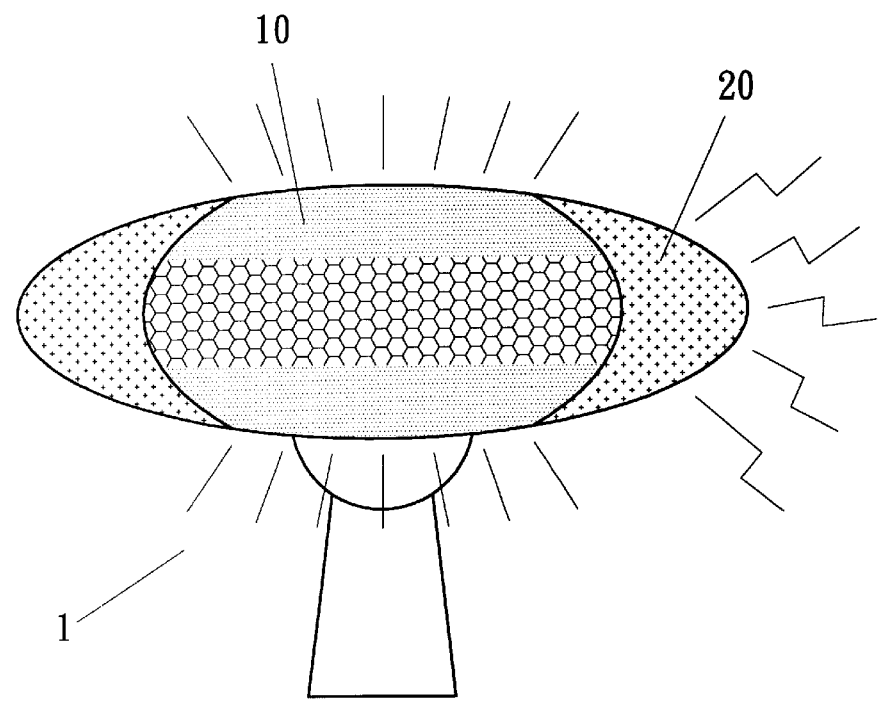
FIG. 2 is an operational view of the safety warning device as shown in FIG. 1.
Figure 3:
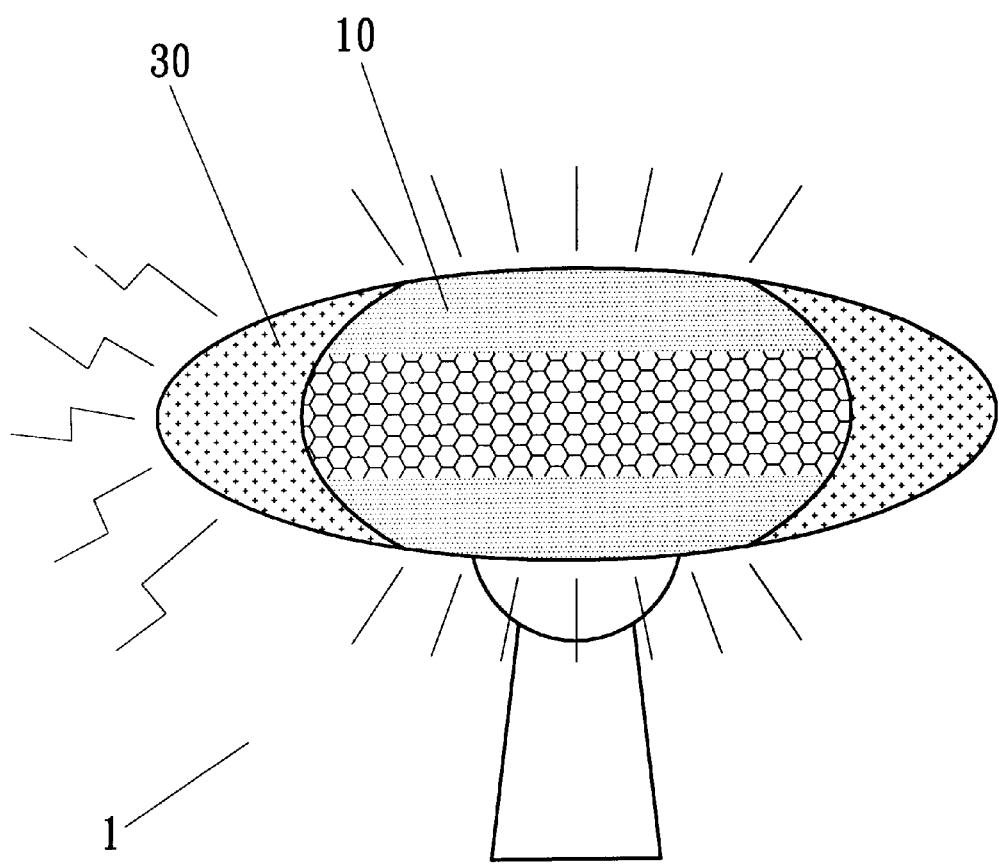
FIG. 3 is an operational view of the safety warning device as shown in FIG. 1.

Referring to the drawings and initially to FIGS. 1–3, a multifunctional safety warning device for a vehicle in accordance with the present invention comprises a red mediate light bar zone 10 having a first side and a second side, a yellow left indicating light 30 mounted on the first side of the mediate light bar zone 10 and being adapted to light independently, and a yellow right indicating light 20 mounted on the second side of the mediate light bar zone 10 and being adapted to light independently.

In practice, each of the mediate light bar zone 10, the left indicating light 30, and the right indicating light 20 is a light permeable housing in which a light source such as an L.E.D. or bulb or back light (BL) is mounted. In such a manner, the outstanding mediate light bar zone 10 can be used to efficiently separate the left indicating light 30 from the right indicating light 20.

Figure 7:
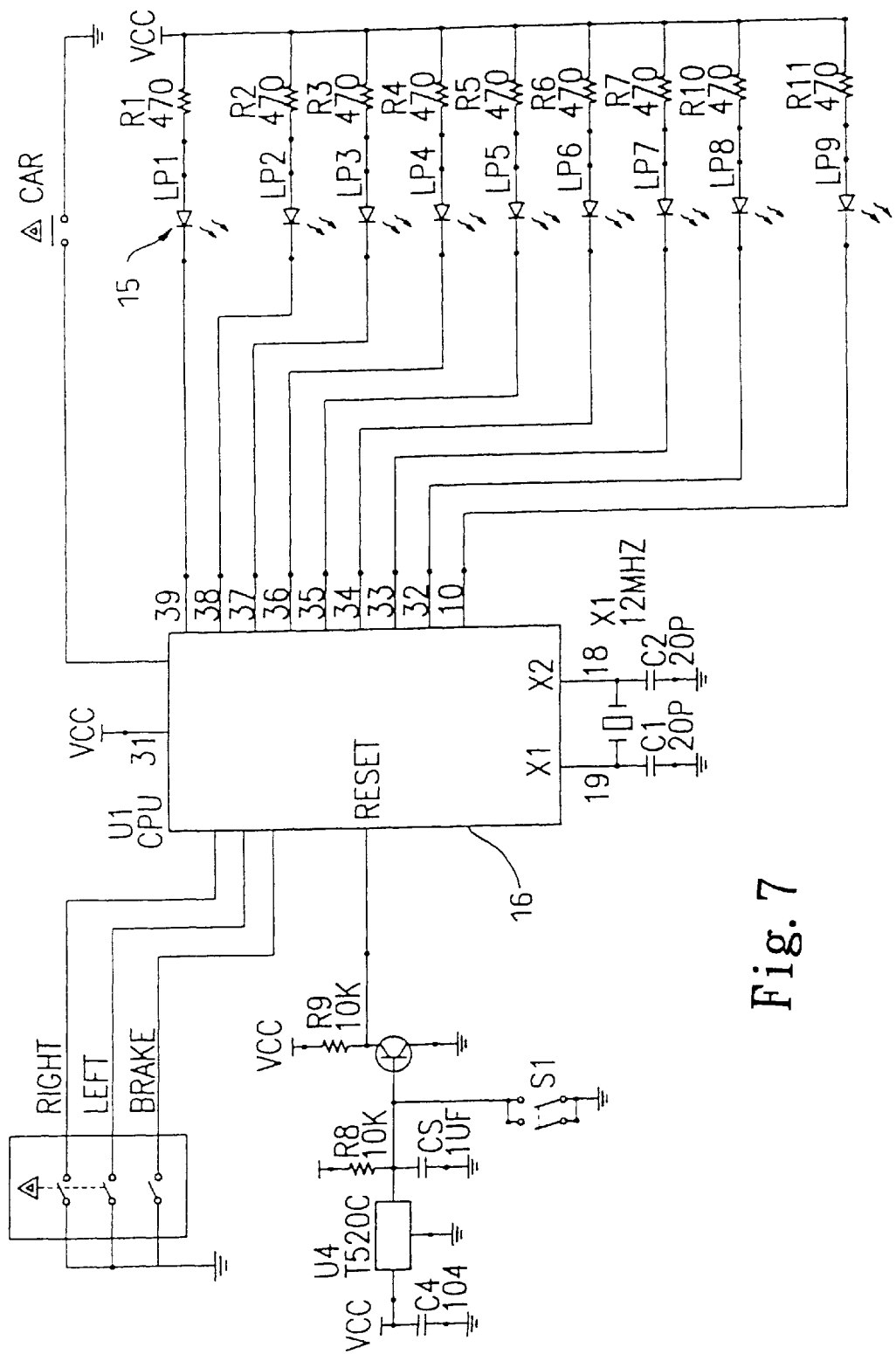
FIG. 7 is a circuit diagram of the safety warning device as shown in FIG. 4.

The mediate light bar zone 10, the left indicating light 30, and the right indicating light 20 are connected to and controlled by a control unit 16 (see FIG. 7). The control unit 16 can be adapted to be a central processing unit C.P.U., or an equivalent control circuit, and the control unit 16 is connected to a light control system of the vehicle.

The control unit 16 is used to alternatively operate the mediate light bar zone 10, the left indicating light 30, and the right indicating light 20 of the safety warning device 1, and to operate a set of breakdown light of the vehicle so that at least one set of light is used indicate the steering direction of the vehicle.

When a warning function is required, the breakdown light switch of the safety warning device 1 is opened, the control unit 16 is used to operate the safety warning device 1 so that the yellow left indicating light 30 and the yellow right indicating light 20 blink simultaneously, and at the same time, the red mediate light bar zone 10 lights continuously as shown in FIG. 1, so as to warn a following vehicle, thereby facilitating the following vehicle apparently distinguishing the left indicating light 30 and the right indicating light 20 and knows the front vehicle is disposed at an emergency state.

When the safety warning device 1 is used to function as a direction indicating device, the directional light switch of the vehicle is opened, the red mediate light bar zone 10 lights continuously, and at the same time, the yellow right indicating light 20 blinks as shown in FIG. 2 when the vehicle is turned right, or the yellow left indicating light 30 blinks as shown in FIG. 3 when the vehicle is turned left, until the directional light switch of the vehicle is closed. Therefore, by means of the red mediate light bar zone 10, the following vehicle can easily distinguish the opening of the left indicating light 30 or the right indicating light 20, thereby efficiently reminding the following vehicle of the state of the front vehicle.

Figure 4:
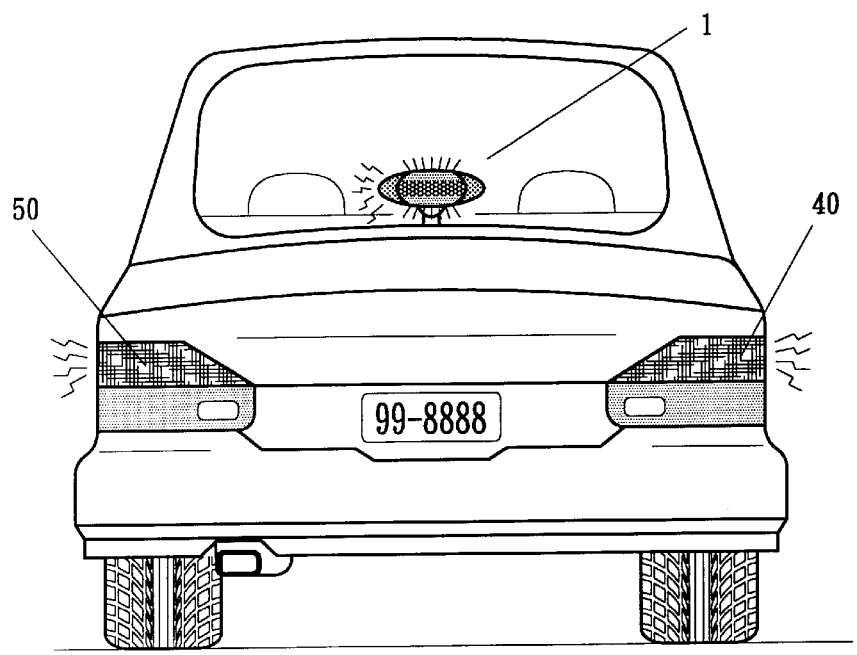
FIG. 4 is a schematic view of a multifunctional safety warning device for an automobile in accordance with the present invention.
Figure 5:
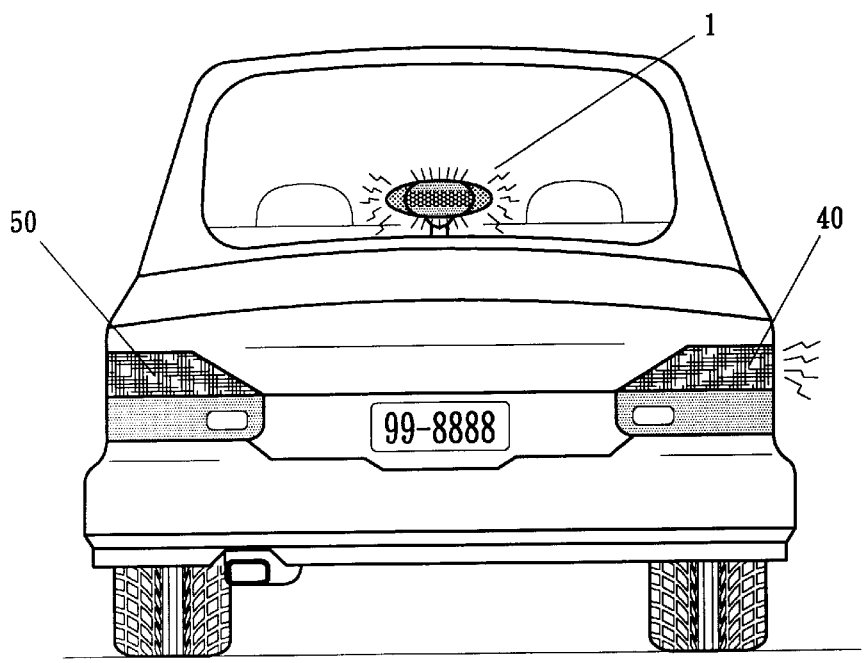
FIG. 5 is an operational view of the safety warning device as shown in FIG. 4.
Figure 6:
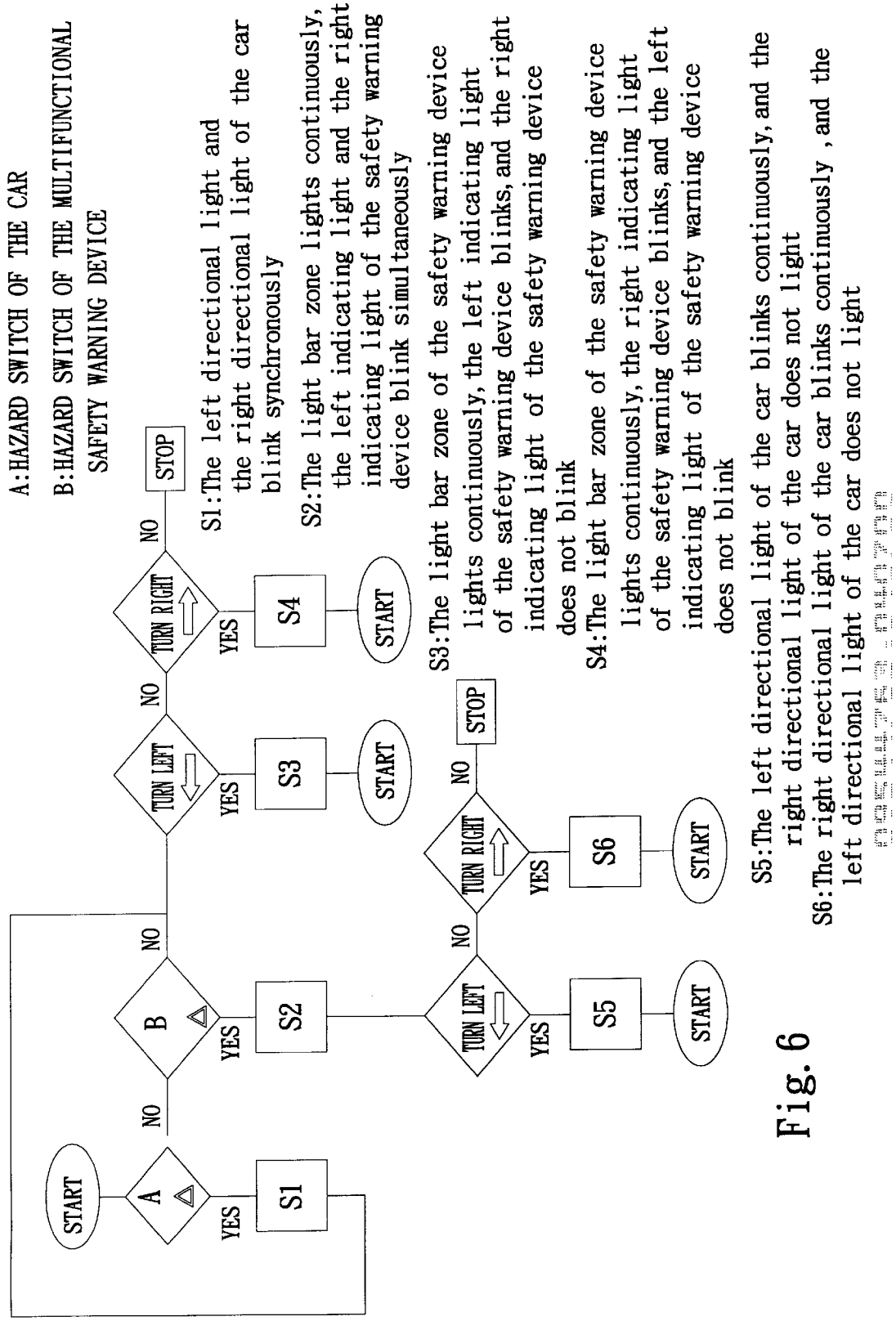
FIG. 6 is a block view of the safety warning device as shown in FIG. 4.

Referring to FIGS. 4–7 with reference to FIGS. 1–3, the safety warning device 1 according to the present invention is used to an automobile. When the automobile opens its breakdown light, the system inside of the automobile will synchronously transfer the signal to the control unit 16 as shown in FIGS. 6 and 7 so that the control unit 16 will control the left directional light 50 and the right directional light 40 to blink synchronously as shown in FIG. 4 (step S1 in FIG. 6, at state "YES").

When the automobile is intended to turn its direction, the automobile will no longer use its directional light 40 or 50 to indicate the direction to be turned due to the left directional light 50 and the right directional light 40 blinking synchronously.

At the same time, the safety warning device 1 is connected to the directional light switch of the automobile via the control unit 16. Therefore, the driver only needs to operate the directional light switch of the automobile so that the red mediate light bar zone 10 lights continuously, and at the same time, the yellow left indicating light 30 blinks (and the yellow right indicating light 20 does not blink) as shown in FIG. 4 when the vehicle is turned left (step S3 in FIG. 6), or the yellow right indicating light 20 blinks (and the yellow left indicating light 30 does not blink) when the vehicle is turned right (step S4 in FIG. 6) so as to warn the following car.

Alternatively, when the automobile breaks down or is disposed in an emergency (step S1 in FIG. 6, at state "NO"), the breakdown light of the safety warning device 1 can also be opened so that the red mediate light bar zone 10 lights continuously, and at the same time, the yellow left indicating light 30 and the yellow right indicating light 20 blink simultaneously as shown in FIG. 5 (step S2 in FIG. 6) so as to warn the following car. In such a situation, the left directional light 50 blinks continuously, and the right directional light 40 does not light (step S5 in FIG. 6), or the right directional light 40 blinks continuously, and the left directional light 50 does not light (step S6 in FIG. 6), so that the directional lights 40 and 50 can be used to play their direction indicating function normally.

Accordingly, when the automobile is disposed in an emergency condition, the red mediate light bar zone 10 lights continuously, and at the same time, the yellow left indicating light 30 and the yellow right indicating light 20 simultaneously blink so as to warn the following car so that the following car at a distant position can clearly distinguish the yellow left indicating light 30 and the yellow right indicating light 20 by separation of the red mediate light bar zone 10, thereby preventing mistaking the yellow left indicating light 30 and the yellow right indicating light 20 as the same light.

In addition, when the breakdown lights of the automobile itself blink, the control unit 16 can be used to control the yellow left indicating light 30 and the yellow right indicating light 20 not to blink, or alternatively, when the yellow left indicating light 30 and the yellow right indicating light 20 blink, the control unit 16 can be used to control the breakdown lights of the automobile itself not to blink.

In such a manner, when the breakdown indication function of the present invention or the automobile itself acts, a set of lights are maintained to be used for indicating directions of turning so that the two sets of breakdown lights of the present invention and the automobile itself can be alternatively used for indicating the direction of turning of the automobile.

It should be clear to those skilled in the art that further embodiments may be made without departing from the scope of the present invention.

What is claimed is:

1. A multifunctional safety warning device for a vehicle comprising:

a mediate light bar zone (10) having a first side and a second side;

a left indicating light (30) mounted on said first side of said mediate light bar zone (10) and being adapted to light independently; and a right indicating light (20) mounted on said second side of said mediate light bar zone (10) and being adapted to light independently;

wherein, said mediate light bar zone (10), said left indicating light (30), and said right indicating light (20) are connected to and controlled by a control unit (16), whereby, said control unit (16) is used to alternatively operate said mediate light bar zone (10), said left indicating light (30), and said right indicating light (20) of said safety warning device (1), and to operate a set of breakdown light of said vehicle so that at least one set of light is used indicate a steering direction of said vehicle.

2. The multifunctional safety warning device in accordance with claim 1, wherein when said breakdown light of said vehicle blinks, said control unit (16) is used to operate said left indicating light (30) and said right indicating light (20) of said safety warning device (1) so that said left indicating light (30) and said right indicating light (20) do not blink so as to indicate a turn left/right steering direction of said vehicle.

3. The multifunctional safety warning device in accordance with claim 1, wherein when said left indicating light

(30) and said right indicating light (20) of said safety warning device (1) blink, said control unit (16) is used to operate said breakdown light of said vehicle so that breakdown light of said vehicle does not blink so as to indicate a turn left/right steering direction of said vehicle.

4. The multifunctional safety warning device in accordance with claim 1, wherein when said left indicating light (30) and said right indicating light (20) of said safety warning device (1) blink, said control unit (16) is used to operate said mediate light bar zone (10) so that said mediate light bar zone (10) lights continuously, thereby facilitating a following vehicle apparently distinguishing said left indicating light (30) and said right indicating light (20) and knows a front vehicle is disposed at an emergency state.

5. The multifunctional safety warning device in accordance with claim 1, wherein a light source of said safety warning device (1) is an L.E.D.

6. The multifunctional safety warning device in accordance with claim 1, wherein a light source of said safety warning device (1) is a bulb.

7. The multifunctional safety warning device in accordance with claim 1, wherein said control unit (16) is a central processing unit (C.P.U.).

8. The multifunctional safety warning device in accordance with claim 1, wherein said control unit (16) is an equivalent control circuit.

* * * * *